United States Patent
Smith (10) Patent No.: US 8,009,057 B2
(45) Date of Patent: Aug. 30, 2011

(54) SELF-POWERED WIRELESS SENSOR SYSTEM INCLUDING A POWER GENERATING SUBSYSTEM

(75) Inventor: Steven L. Smith, Buford, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

(21) Appl. No.: 12/869,825

(22) Filed: Aug. 27, 2010

(65) Prior Publication Data

US 2010/0320881 A1 Dec. 23, 2010

Related U.S. Application Data

(63) Continuation of application No. 11/945,706, filed on Nov. 27, 2007, now Pat. No. 7,864,067.

(51) Int. Cl.
*G08B 21/00* (2006.01)

(52) U.S. Cl. ............... 340/676; 340/693.1; 340/539.1; 198/810.01

(58) Field of Classification Search .............. 340/676, 340/540, 539.1, 693.1; 198/810.01–810.04
See application file for complete search history.

(56) References Cited

U.S. PATENT DOCUMENTS

| 4,087,800 | A | 5/1978 | Lee |
| 6,237,752 | B1 | 5/2001 | El-Ibiary |
| 6,715,602 | B1 | 4/2004 | Gartland |
| 2007/0182535 | A1* | 8/2007 | Seguchi ............ 340/457.1 |

* cited by examiner

*Primary Examiner* — Jeffery Hofsass
(74) *Attorney, Agent, or Firm* — Alston & Bird LLP (57) ABSTRACT

A wireless sensor system for sensing a characteristic associated with a conveying system from which the sensor system generates operating power. The sensor system includes a transducer including an axle, a roller connected to the axle, and a link connected to the roller. The transducer may be configured to permit the roller to be positioned in contact with a conveyor belt of the conveying system so that the roller rotates about the axle or with the axle in response to translation of the conveyor belt. The sensor system also includes a power generator connected to the link, wherein the link transfers rotary motion from the roller to the generator, which generates power using the rotary motion input by the link. The sensor system further includes a sensor connected to the generator for receiving power, wherein the sensor is configured to sense the physical characteristic associated with the conveying system.

22 Claims, 3 Drawing Sheets

SELF-POWERED WIRELESS SENSOR SYSTEM INCLUDING A POWER GENERATING SUBSYSTEM

CROSS-REFERENCE TO RELATED APPLICATIONS

This application is a continuation of U.S. application Ser. No. 11/945,706, filed Nov. 27, 2007 now U.S. Pat. No. 7,864,067, which is hereby incorporated herein in its entirety by reference.

FIELD OF THE INVENTION

Various embodiments of the present invention relate to sensor systems and, more specifically, to self-powered wireless sensor systems.

BACKGROUND OF THE DISCLOSURE

Users of apparatus, such as conveyor systems, often wish to monitor physical characteristics of the apparatus during its operation for various reasons. For example, a user may wish to monitor a speed at which a conveyor belt of the conveyor system is moving to ensure that it is moving within a desired speed range. As another example, the user may wish to monitor a temperature of a part of the apparatus to ensure that the temperature of the part does not exceed a predetermined threshold. Particularly, users sometimes wish to monitor a temperature of a part of the apparatus that is known to overheat or heat up in advance of failure. For instance, it has been determined that a rubber bead trimming some conventional conveyor belts heats up when subjected to unbalanced forces. Such unbalanced forces may result from improper alignment of elements of the apparatus driving or guiding the belt by way of the bead. By determining that the trimming bead is heating undesirably, the user may halt the conveyor for inspection and possible maintenance in advance of failure and other damage or injury.

Sensors for monitoring many physical characteristics are relatively inexpensive. However, positioning one or more of the sensors at locations remote from a central processor, such as about a warehouse, can be prohibitive due to a relatively high cost of wiring power to the sensors and also a relatively high cost of providing communication wiring for transmitting the sensor output signals to the central processor.

BRIEF SUMMARY OF THE DISCLOSURE

Embodiments of the present invention relate to a wireless sensor system for sensing a physical characteristic associated with a conveying system from which the sensor system generates operating power. The sensor system of these embodiments includes a transducer including at least one axle, a roller rotatably connected to each axle, and a link connected to the roller. The transducer may be configured to permit the roller to be positioned in contact with a conveyor belt of the conveying system so that the roller rotates about the axle or with the axle in response to the conveyor belt translating during operation of the sensor system. The sensor system also includes a power generator connected to the link, wherein the link transfers rotary motion from the roller to the generator, which generates power using the rotary motion input by the link during operation of the sensor system. The sensor system further includes a sensor connected to the generator for receiving power, wherein the sensor is configured to sense the physical characteristic associated with the conveying system.

Embodiments of the present invention also relate to a wireless sensor system for sensing a physical characteristic associated with a package handling system from which the sensor system generates operating power. The sensor system of these embodiments includes a power-generating subsystem configured for generating power from energy derived from the package handling system. The sensor system also includes a sensor connected to the power-generating subsystem for receiving the power generated by the power-generating subsystem, wherein the sensor is configured to sense the physical characteristic associated with the package handling system.

Embodiments of the present invention further relate to a method of monitoring a conveying system having a conveyor belt using a wireless sensor system including a transducer having an axle, a roller rotatably connected to the axle, a link connected to the roller, a generator connected to the link, and a sensor. The method includes providing the wireless sensor system adjacent the conveying system so that the roller contacts the conveyor belt of the conveying system and operating the conveying system so that the belt moves thereby causing the roller to rotate in contact with the belt. The method also includes transferring rotary motion of the roller to the generator by way of the link and generating power in the generator using the rotary motion received from the link. The method further includes transferring power generated in the generating step to the sensor and sensing a physical characteristic of the conveying system using the sensor being powered by the power received from the generator.

Embodiments of the present invention yet further include a method of monitoring an apparatus using a wireless sensor system including a power-generating subsystem and a sensor connected to the power-generating subsystem. The method includes providing the wireless sensor system adjacent the apparatus and generating power from energy derived from the apparatus using the power-generating subsystem. The method also include transferring the power generated in the power-generating step from the power-generating subsystem to the sensor and sensing a physical characteristic associated with the apparatus using the sensor being powered by the power received from the generator.

BRIEF DESCRIPTION OF THE DRAWINGS

Having described various embodiments of the invention in general terms, reference will now be made to the accompanying drawings, which are not necessarily drawn to scale, and wherein.

DETAILED DESCRIPTION OF THE DISCLOSURE

The present invention will now be described more fully hereinafter with reference to the accompanying figures, in which some, but not all embodiments of the invention are shown. Indeed, this invention may be embodied in many different forms and should not be construed as limited to the embodiments set forth herein. Rather, these embodiments are provided so that this disclosure will satisfy applicable legal requirements. Like numbers refer to like elements throughout.

The present disclosure describes various embodiments of a self-powered wireless sensor system according to the present invention. The sensor system may generate its operating power using energy derived from an apparatus, such as a conveyor system. The generated power is used to power a sensor, which senses physical characteristics associated with the apparatus. For example, the sensor system may include two rollers sandwiching or pinching a belt of the conveying apparatus between them so that the rollers turn when the belt translates. The rotating rollers are connected to a converter, which generates power from the rotation.

The generator may also power a transmitter, which wirelessly sends an output signal of the sensor to a remote personal computer or programmable logic controller (PLC), which in turn may process the signal and communicate messages such as warnings to users of the system.

The sensor system according to some embodiments of the present invention may be referred to as being self-powered because it generates its own power using energy derived from the apparatus with which it runs in combination. The system according to some embodiments of the invention may be referred to as being wireless because it does not require wires for receiving power from an external source and also because it may be free of hard-wired communication lines to a remote processor.

Figure 1A:
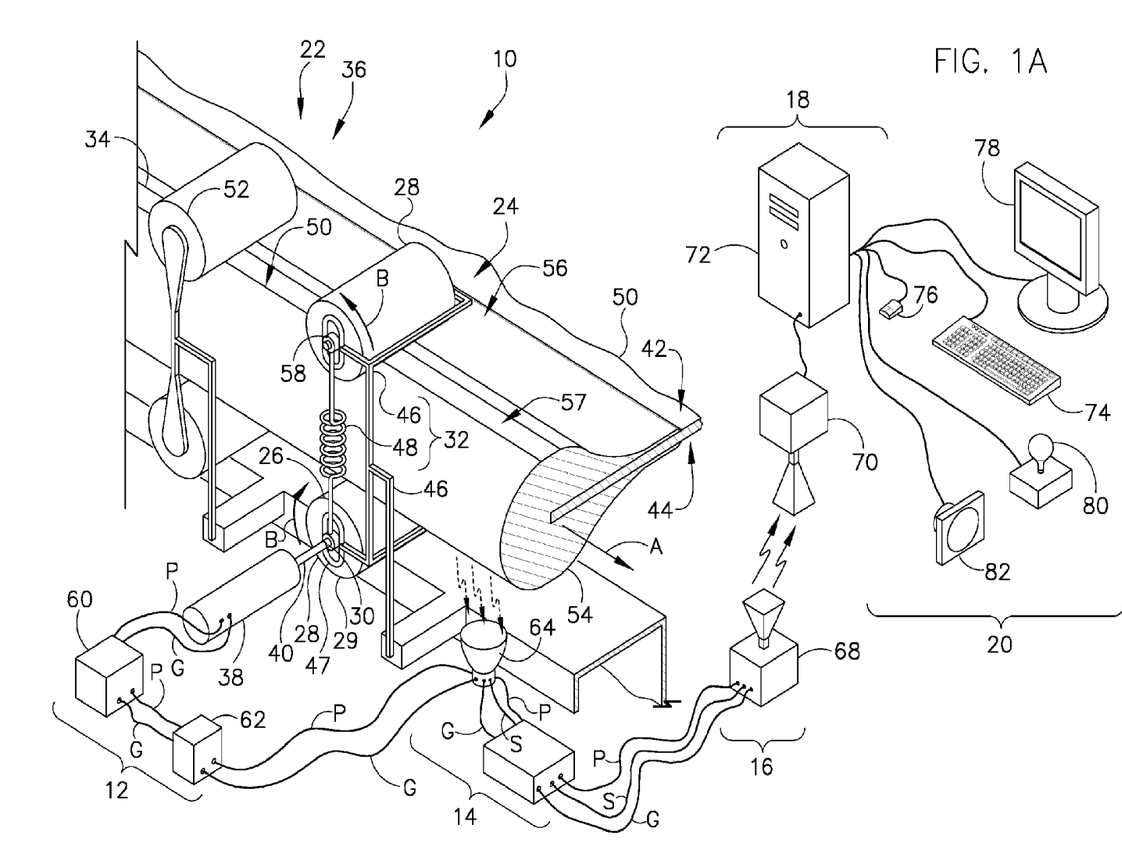
FIG. 1A is a perspective of a sensor system according to a first embodiment of the present invention in combination with an apparatus.

Referring to the figures, and more particularly to FIG. 1A, a self-powered wireless sensor system according to an embodiment of the present invention is designated in its entirety by reference number 10. The sensor system 10 comprises multiple subsystems including a power-generating subsystem 12 and a sensing subsystem 14. The sensor system 10 may also include a transmitting subsystem 16, a processing subsystem 18, and a communicating subsystem 20.

The power-generating subsystem 12 generates power for operating the sensor system 10 using energy derived or captured from an apparatus 22, such as a package handling system. An exemplary package handling system is or includes a conveyor belt system, as shown in FIG. 1A. The concept described herein of powering a sensor using energy derived from an apparatus and sensing a characteristic associated with the apparatus may be used in connection with a variety of apparatus, including package handling systems and other types of systems.

The sensing subsystem 14, powered by the power created in the generating subsystem 12, senses select physical characteristics or variables, such as a temperature or a speed of a part associated with the apparatus 22 (e.g., a conveyor belt of the system 22 or other part). The transmitting subsystem 16 sends an output signal received from the sensing subsystem 14 to the processing subsystem 18, which may be remote from the generating, sensing, and transmitting subsystems 12, 14, 16. The transmitting subsystem 12 may wirelessly send the sensor output signal to the processing subsystem 18. These and other components and functions of the subsystems 12, 14, 16, 18, 20 are described below in further detail.

The power-generating subsystem 12 may be configured to generate power using various types of energy of the apparatus 22. In one embodiment, it is preferred that the generating subsystem 12 generates power using energy from the apparatus, such as energy exerted by, emitted by, or created by the apparatus 22 in usual operation of the apparatus 22. Types of energy that may be harnessed by the generating subsystem 12 are not limited and may include energy emanating from the apparatus 22. For example, the generating subsystem 12 may be configured to harness thermal energy, such as heat dissipating from the apparatus 22, or mechanical or kinetic energy, such as energy present in the moving of parts of the apparatus. Mechanical movement of the apparatus 22 from which the generating subsystem 12 may generate power may include rotation of a part of the apparatus 22, such as a rotating spindle, axle or shaft, translation of a part of the apparatus 22, such as a conveyor belt, or vibration of the apparatus 22.

The configuration of the power-generating subsystem 12 depends on the type of energy it will capture and convert to power. For example, embodiments of the sensor system 10 in which the power-generating subsystem 12 is meant to capture thermal energy from heat dissipated by the apparatus 22 may include a thermoelectric device. For embodiments of the sensor system 10 in which the power-generating subsystem 12 captures mechanical energy from the apparatus 22, the system 10 may include an electromechanical transducer for capturing the mechanical energy and converting it into electric power.

Figure 2:
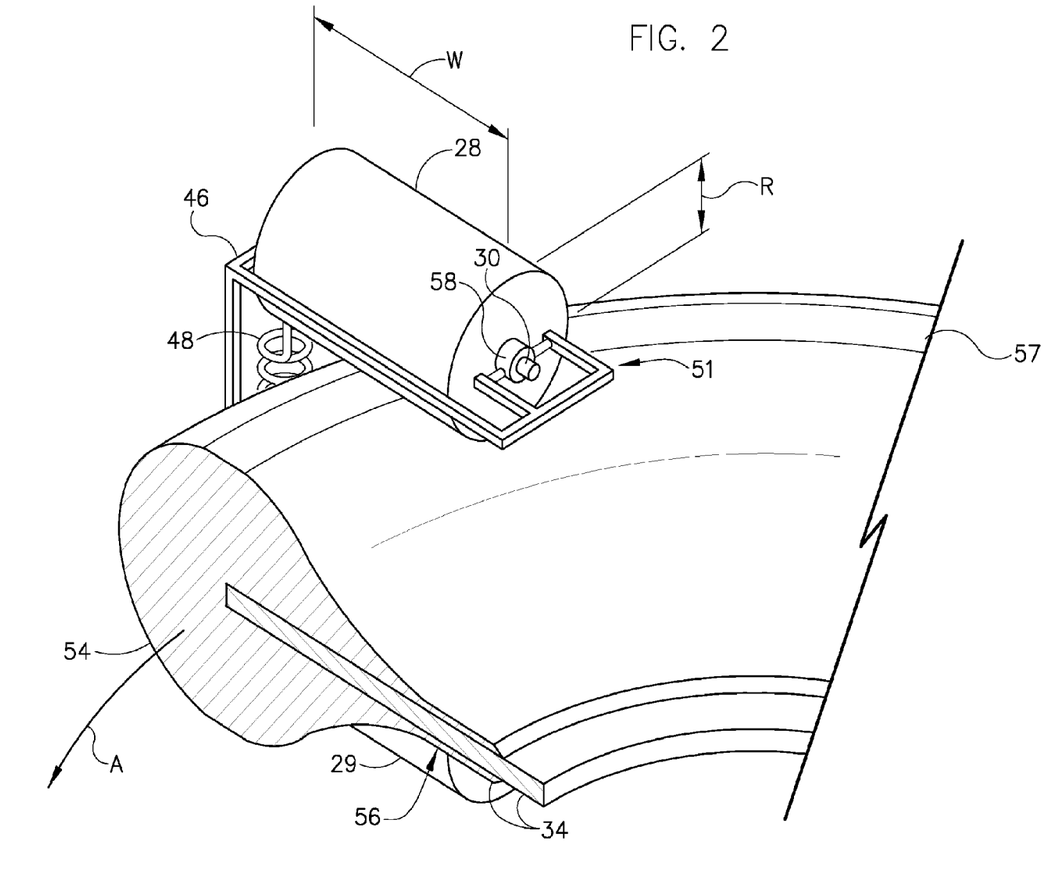
FIG. 2 is a close-up and partially cut-away perspective of a portion of a transducer of the system shown in FIG. 1A.

FIGS. 1A and 2 show an embodiment of the sensor system 10 in which the power-generating subsystem 12 includes an electromechanical drive or transducer 24 for capturing mechanical energy from the apparatus 22 and converting it into electric power. In this embodiment, the electromechanical transducer 24 includes a motion-translating mechanism 26, shown in an exemplary form having one or more rollers 28. The rollers 28 may be rotatably connected to corresponding axles 30 so that the rollers 28 rotate about the corresponding axles 30. One or more of the rollers 28 may also be fixedly connected to corresponding axles 30 so that the rollers 28 and axles 30 rotate together during operation of the sensor system 10. The electromechanical transducer 24 also includes stabilizing components 32 for holding the rollers 28 in place adjacent and in rolling contact with the apparatus 22. For example, the transducer 24 may include stabilizing components 32 for holding the rollers 28 in place adjacent and in rolling contact with a conveyor belt 34 of a conveyor system 36. The transducer 24 of this embodiment also includes a converter 38, such as a generator, and a link 40, such as a shaft, connecting at least one driving roller 29 of the one or more rollers 28 to the converter 38. The driving roller 29 provides the rolling, mechanical, energy with which the converter 38 generates the operating power for the sensor system 10. The link 40 may be considered a part of the motion-translating mechanism 26, or may be separate from and connected to it.

In general, the motion-translating mechanism 26 converts motion in one form, such as vibrational, rotational, or translational, into another form. For example, the motion-translating mechanism 26 can translate motion of a part of the apparatus 22 being within one degree of freedom, such as translating or rotating in a particular direction, to motion of another part, such as a part of a generator or link to the generator, being within another degree of freedom, such as rotating or translating in another particular direction. For instance, the motion-translating mechanism 26 shown in FIGS. 1A and 2 converts translational motion of the conveyor belt 34 into rotational motion of one or more rollers 28, including at least one driving roller 29 connected to the converter 38. Specifically, translation of the conveyor belt 34 in a direction indicated by arrow A causes at least the driving roller 29 held in rolling contact with the belt 34 to rotate in a direction indicated by arrow B.

The sensor system 10 may be configured so that if the conveyor belt 34 translated in an opposite direction, opposite to that indicated by arrow A, the roller 28 would likewise rotate in an opposite direction, opposite to that indicated by arrow B. It is contemplated that the sensor system 10 may be configured so that the power-generating subsystem 12 can generate power from mechanical energy of the belt as it translates in either direction. For embodiments of the sensor system 10 having two rollers 28 held in rolling contact with opposite sides 42, 44 of the belt 34, the belt 34 translating in direction A will cause the rollers 28 to rotate in opposite directions B.

The rollers 28 are held in place adjacent the conveyor 36 by the stabilizing components 32, which may include various types of framework or rails 46 connecting the axles 30 to the conveyor 36 and/or to another support (not shown), such as a static stand that may be a part of the sensor system 10. As shown in the figures, the rails 46 may connect to the rollers 28 on both sides of each roller. It is contemplated that the rails 46 may also be shaped and sized to form cavities or slots 47 connecting to the axles 40 so that the axles can move in the cavity. The stabilizing components 32 may form slots 47 about the axle 40 of one of the rollers 28, but not about the axle 40 the other.

The stabilizing components 32 may form slots 47 on one end of a roller 28, but not on an opposite end of the same roller. For example, FIG. 1A shows the stabilizing components 32 forming a slot 47 adjacent a first end of a non-drive roller 28 (e.g., a topmost roller of the system 10 in the figure) and FIG. 2 shows the stabilizing components 32 not forming a slot on a second end of the same non-drive roller. As shown in FIG. 2, the stabilizing components 32 may include a pivoting structure 51 connected to the second end of the non-drive roller 28 allowing the first end of the non-drive roller 28 to move within the slot 47 (shown in FIG. 1A) to pivot or hinge about the second end being connected to the pivoting structure. In this way, the spring component 48 can bias the non-drive roller 28 toward the drive roller 29 by pulling the first end of the roller toward the belt 34, thereby promoting pinching the belt 34 between the two rollers. The stabilizing components 32 may similarly form a slot around a first end of the drive roller 29, as shown in FIG. 1A, and include a pivoting structure at a second end of the drive roller, similar to that shown in FIG. 2 adjacent the non-drive roller, to enable the drive roller to pivot and thereby facilitate biasing of the drive roller toward the belt 34.

For embodiments of the present invention in which the link 40 to the converter 38 is generally stationary, the drive roller 29 may be generally kept from moving within the adjacent slot 47 of the stabilizing components 32, or the stabilizing components can be formed to directly connect to a bearing structure on the first, converter-link, end of the drive roller and not form a slot 47 adjacent that first end. The bearing structure (e.g., structure 58 shown in FIG. 1A) may be connected to the roller axle 30 for enabling or facilitating rolling of the roller. In these embodiments, the spring component 48 may connect to a part of the stabilizing components 32, to the axle 32, or to such bearing structure, and connection to one of these elements is to be considered connection (e.g., indirectly) to the other of these elements that are present when the elements are connected. For example, when the axle 32 is connected to a bearing structure, which is in turn connected to the spring component 48, the spring component may be said to be connected to the bearing structure and also said to be connected to the axle.

For ensuring that the rollers 28 stay in contact with the belt 34 despite fluctuations in belt levels, the stabilizing components 32 may include a spring component 48 biasing the rollers 28 toward the belt 34, such as one or more springs. Exemplary springs include helical or coil springs. The limited movement that the rollers 28 have within the slots 47 of the stabilizing components 32 allows the rollers 28 to be biased toward the belt 34 by the springs and to move slightly as needed, such as to accommodate the belt moving slightly up or down. The transducer 24 of embodiment of the system 10 having two rollers sandwiching the conveyor belt 34 may be called a pinch drive. The springs 48 are configured, and connected to the axles 30 for biasing the roller 28 toward the conveyor belt 34.

Figure 1B:
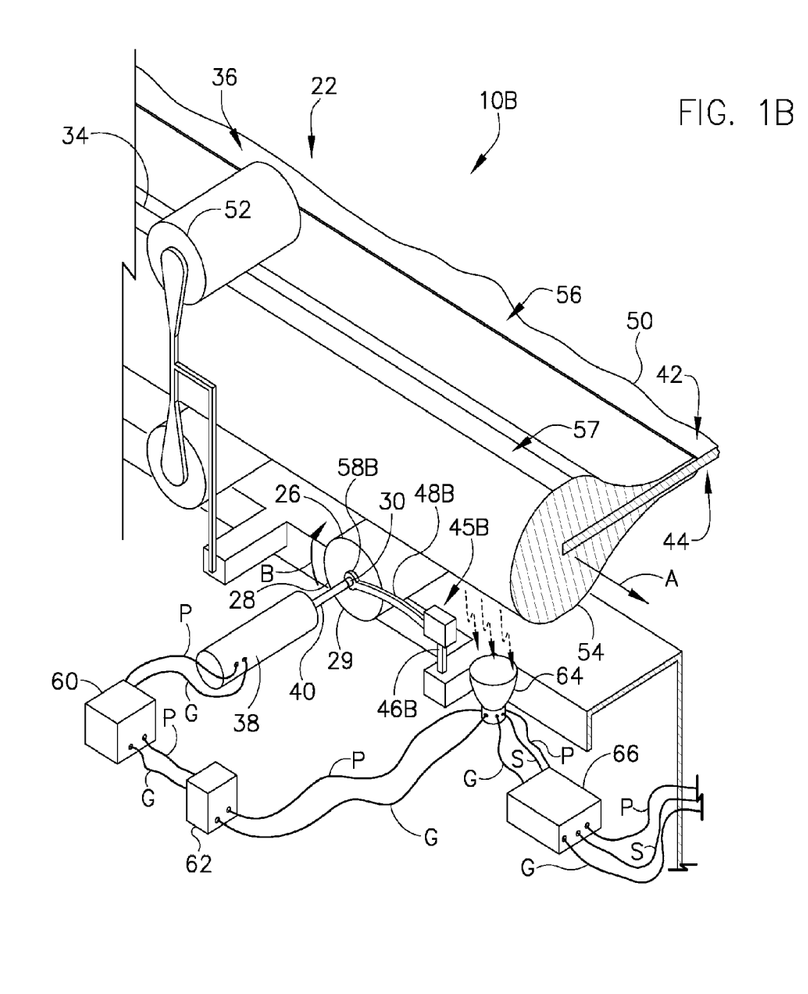
FIG. 1B is a perspective of a sensor system according to a second embodiment of the present invention in combination with the apparatus.

FIG. 1B shows a sensor system 10B according to a contemplated embodiment of the present invention in which the stabilizing components 32B include a cantilever spring 48B connected at one of its ends to the axle 30, by way of a bearing arrangement 58B, and at its other end to a static portion 49B of the conveyor system 36 or a static part 45B (e.g., rails 46B) of the stabilizing components. The cantilever spring 48B may be connected to the axle 30 on one or both sides of the roller 28, such as by connecting to a bracket or rail (not shown) connecting the axle on each side of the roller. The system 10B may include two cantilever springs 48B connected to the axle, each connected to the axle on a respective side the roller 28. The cantilever spring 48B of this embodiment is configured, and attached to the axle 30 and to the static part 45B or to the conveyor system 36, for biasing the roller 28 toward the conveyor belt 34. The sensor system 10B according to this embodiment is otherwise the same as the sensor system 10 according to the first embodiment and thus will not be described separately in further detail.

The rollers 28 may be sized and shaped in a variety of ways without departing from the scope of the present invention. For example, the rollers 28 may have various widths W and radii R (shown in FIG. 2) without departing from the scope of the present invention. Although each roller 28 may have other widths W, in one embodiment each roller 28 has a width W of between about " about 0.5 inch and about 1 inch. Although each roller 28 may have other radii, in one embodiment each roller 28 has a radius R of between about 0.5 inch and about 0.75 inch. The rollers 28 may also comprise a variety of materials without departing from the scope of the present invention. For example, in one embodiment the rollers 28 are made of steel or another strong and resilient material.

The material of the rollers 28 may be selected to ensure a sufficient coefficient of friction between the rollers 28 and the conveyor belt 34. A sufficient coefficient of friction is one that is high enough to ensure that the belt 34 causes the rollers 28 to roll on the belt as the belt translates, instead of allowing relative motion between the belt 34 and the roller 28 by the belt sliding past the rollers 28. The rollers 28 generally do not need to comprise a particularly high-friction material to accomplish a sufficient coefficient of friction between the rollers 28 and the belt 34 when the belt includes a relatively high-friction material.

The coefficient of friction between the rollers 28 and the conveyor belt 34 is also affected by a force by which the rollers 28 are biased against the conveyor belt 34. Accordingly, the transducer 24 including any springs 48 should be configured so that the rollers 28 are pressed against the conveyor belt 34 with sufficient force, considering the relative frictions of the materials, to ensure a sufficient effective or working coefficient of friction between the rollers 28 and the belt 34 during operation of the sensor system 10.

Belts 34 of modern conveyor systems comprise generally high-friction materials. Accordingly, rollers 28 of sensor systems 10 used with these conveyor systems may comprise a relatively low friction material, such as a generally smooth steel. Exemplary conveyor belt materials 34 include natural or synthetic rubbers, such as latex or neoprene, or a polymer, such as silicone, polyvinyl chloride (PVC) or urethane (or polyurethane).

Some conveyor belts 34 have contouring such as a trim or trim piece, which the rollers 28 may be configured to engage. For example, as shown in the figures, the conveyor belt 34 may include a bead 50 along an edge of the belt 34. Belts 34 with such beads 50 are commonly used for providing rounded conveyor belt sections, configured for turning a direction of the belt. Movement of such rounded or turning belts or belt portions may still be referred to herein as translation. Such a turning belt including a trimming bead 50 is commercially available from, for example, Transnorm System, Inc., of Arlington, Tex. The bead 50 may comprise a variety of materials, such as urethane, or another robust and high friction material. The bead 50 may serve various purposes, including reinforcing the belt 34 against edge tears and providing a sturdy, high friction, and specially contoured surface at which guide or drive components 52 of the conveyor system 36 may guide and/or drive the belt 34.

The electromechanical transducer 24 may be sized and shaped corresponding to sizes and shapes of the part of the apparatus 22 (e.g., conveyor belt 34) that the transducer will engage for receiving the mechanical energy of the apparatus during operation of the sensor system 10. For example, in some embodiments (not shown in detail), the rails 46, axles 30, rollers 28, and springs 48 of the transducer 24 may be sized and shaped for pinching a rounded portion 54 of the bead 50 or a generally flat portion 56 of the bead 50 between the rollers 28. A benefit of engaging the flat portion 56 of the bead 50 with the rollers 28 would be that the rounded portion 54 of the bead may provide lateral support for keeping the rollers 28 on the generally flat portion 56 and from moving laterally off of the belt 34. The bead 50 may also include a contact portion 57 on the round portion 54. The bead 50 may include such a contact portion 57 on one or both sides (e.g., top and/or bottom) of the bead for engagement with one and/or two rollers 28. As shown in the figures, the electromechanical transducer 24 may be configured so that the rollers 30 engage the contact portion 57 of the bead 50. Further, in a contemplated embodiment, the rollers 28 may be shaped to conform to a surface of the apparatus 22 that the rollers 28 will engage, such as having a generally concave outer surface conforming to the generally rounded portion 54 of the bead 50.

As described above, in embodiments of the sensor system 10 having multiple rollers 28, the corresponding axles 30 may be rotatably or fixedly connected to the rollers 28. That is, the transducer 24 may be configured so that the axles 30 are connected to corresponding rollers 28 so the rollers rotate about the axles 30 or configured so that one or more of the rollers and their corresponding axles 30 rotate together. In any case, the electromagnetic transducer 24 should be configured so that the mechanical energy of the rolling rollers 28, being translated from the mechanical energy of the translating belt 34, can be transferred to the link 40 for transferring to the converter 38 (shown in FIG. 1). It is further contemplated that the converter 38 may be directly connected to the drive roller 29, whereby a link 40 is not needed or the axle 40 is considered the link 40.

FIGS. 1A and 2 show an embodiment of the present invention in which the axles 30 are affixed to the rollers 28 so that the axles and rollers rotate together. In this embodiment, structure connected to the axles 30, such as the stabilizing components 32, may be connected to the axles 30 by one or more bearing arrangements 58, or other low-friction arrangements allowing relative motion between the stabilizing components 32 and the axles 30. For embodiments of the present invention in which the stabilizing structure 32 includes slots 47 in which the axles 30 can move, the bearing arrangements 58 may be positioned in the slots 47 so that the bearing arrangements move in the slots 47 with the axles 30. In this way, the rollers 28 and axles 30 can rotate together and with respect to the bearings 58, and the axles 30 and the bearing arrangements 58 can slide together in the slots 47 for allowing limited movement of the rollers 28 in one or more directions (e.g., up and down) while also holding the rollers 28 in generally one place regarding other directions (e.g., in the direction A of the belt 34).

The link 40 connects to at least one of the axles 30 for transferring the rotation of the axle 30 to the converter 38. Alternatively, the axle 30 may also serve as the link 40, directly connecting the rollers 28 to the converter 38. A primary purpose of the link 40 is to translate the mechanical rolling energy of the rollers 30 to the converter 38 for creating operating power for the sensor system 10.

As mentioned above, in some embodiments (not shown in detail) of the present invention, at least one of the rollers 28 (e.g., at least a driving roller 29), rotates about static axles 30. In these embodiments, the stabilizing components 32 (e.g., rails 46 and/or springs 48) may be rigidly connected to the static axle for keeping the rollers 28 in place. Also in these embodiments, the rollers 28 may be connected to the axles 30 by a bearing arrangement and, in order to translate the mechanical rolling energy of the rollers 28 to the converter 38, the link 40 may be directly or indirectly connected to at least the driving roller 29 so that the link rotates or otherwise moves with respect to the axle 30 in response to rotation of the roller 28. For example, in one particular embodiment (not shown in detail), the axle 30 corresponding to the drive roller 29 is hollow and the link 40 extends through a cavity of the axle 30 and connects to the roller 29 so that the link 40 rotates with respect to the axle 30 in response to rotation of the roller 28. The sensor system 10 may include bearings or other friction-reducing arrangements disposed between the axle 30 and the link 40 for facilitating relative motion between the axle 30 and the link 40.

As described above, the converter 38 may be directly connected to a moving part of the apparatus 22 (or a part otherwise generating energy, such as heat energy), such as at least one of the guide/drive wheels 52 guiding/driving the conveyor belt 34, or to rollers 28 being part of the power-generating subsystem 12 of the invention. In one contemplated embodiment (not shown in detail), the converter 38 is connected to a moving part of a package conveying system other than the belt 34, such as a swing gate or gears or belt rollers driving the belt or otherwise moving in support of belt operation. The converter 38 may alternatively be indirectly connected to these moving energy sources (e.g., belt 34, gears, belt rollers, etc.) by way of the link 40. For example, the link 40 may include a shaft or other element connecting at least one of the drive wheels 52 of the conveyor system 26, or the rollers 28 of the sensor system 10, to the converter 38 for transferring energy of the conveyor system 26 to the converter 38.

The converter 38 may include a generator configured to create sufficient operating power for the sensor system 10, such as for the sensing subsystem 14 and any transmitting subsystem 16. The power-generating subsystem 12 may include any of various types of converters 38 without departing from the scope of the present invention. In one embodiment, the converter 38 includes an electromagnetic generator. The converter 38 may also include a motor-gear generator.

The converter 38 may be configured to produce power in various forms, such as direct or alternating electric currents (AC or DC, respectively). As referred to above, the sensor system according to the present invention may be referred to as being self-powered because it generates its own power using energy from the apparatus with which it runs in combination.

The generating subsystem 12 may also include a rectifier 60 or similar device for converting the nature of the signal produced by the converter 38. For example, the rectifier 60 may be configured to convert alternating current (AC) produced by the generator to direct current (DC) for use as operating power by other components (e.g., the sensing and transmitting subsystems 14, 16) of the sensor system 10. The rectifier 60 may be connected to the converter 38 by a power line P and a common or ground line G.

The generating subsystem 12 may also include a power supply regulator 62, such as a commercially available class D or class C power supply regulator, connected to the converter 38. The power supply regulator 62 may be connected to the converter 38, or to the rectifier 60 in embodiments having a rectifier 60, by a power line P and a ground line G. The power supply regulator 62 generates a constant output voltage corresponding to the voltage needed to power the sensor system 10. The power supply regulator 62 could be a direct current-to-direct current (DC-to-DC) converter, both receiving and producing direct current. The power supply regulator 62 could be especially helpful when the voltage output of the converter 38 regularly or intermittently varies. The converter 38 output may vary due to, for example, variations in the mechanical energy derived from the conveyor system 36. The rectifier may be connected to the power supply regulator 62 or the power supply regulator 62 may include the rectifier 60.

In many embodiments of the present invention, the power requirements of the sensor system 10 are relatively low. For example, the sensing subsystem 14 and the transmitting subsystem 16 may only require a few watts each or less for operation. In some embodiments, each of the sensing and transmitting subsystems 14, 16 require between less than about one watt and a few watts of power for operations. For embodiments of the present invention in which subsystems of the sensor system 10 require more power, the power-generating subsystem 12 may be configured to provide that higher amount of power.

Also, it is contemplated that the power provided by the power-generating subsystem may be supplemented by power from another source, such as a supplemental or backup electric cell (e.g., battery) providing power intermittently, such as on a regular basis or whenever needed.

Although many of the embodiments of the sensor system 10 according to the present invention are described as being used in combination with a conveyor system 36, and more specifically to converting mechanical energy from translational motion of the conveyor belt 34 or mechanical energy from rotational motion of other parts of the conveyor system 36 (e.g., drive wheels 52), the concepts of capturing energy from the apparatus 22 and converting that energy to operating power can be applied to any of the various embodiments of the present invention without departing from the scope of the invention. For example, although the process of, and structure for, converting rotational motion derived from the conveyor system 36 using an electromechanical generator as converter 38 is described in detail, analogous processes and structure can be easily substituted by one skilled in the art for effectuating other embodiments of the invention. The power-generating subsystem, for example, may include a conventional thermopile for converting heat energy emitted by an apparatus 22 into electrical power.

As a more specific example of power-generating subsystem 12 components converting non-mechanical energy to electrical operating power, the power-generating subsystem 12 of one embodiment (not shown in detail) may be configured to capture thermal energy from the apparatus 22 and convert that energy to operating power may include a hot-side heat sink and a cold-side heat sink. The hot-side heat sink and cold-side heat sink foster and harness a temperature differential, as a transducer 24 analogous to the rollers 28 of some of the mechanical-based embodiments. Further, such subsystem may include a module, wiring, or both for converting the temperature differential between the hot and cold heat sinks to an electric potential and transmitting a generated current, which could be considered analogous to the generator of mechanical-based embodiments. Also, the generating system 12 of these various embodiments may include other described subsystem components, such as the rectifier 60 and the power supply regulator 62 mentioned above. Such alterations to the power-generating subsystem 12 for capturing energy and converting it to operating power may readily be made by those of ordinary skill in the art and are within the scope of the present invention.

The operating power generated, and possibly regulated and rectified, in the power-generating subsystem 12 as described above, is transferred to the sensing subsystem 14. The operating power from the power-generating subsystem 12 may also be supplied to the transmitting subsystem 16, which is described below in further detail.

In one contemplated embodiment, the sensor system 10 includes a power-storing device (not shown), such as a conventional rechargeable battery. The power-storing device may be connected to, or part of, the power-generating system 12 for receiving and storing power generated in the converter 38. The power-storing device could store power until it is needed by other parts of the sensor system 10. The power-storing device may be a "super capacitor", which are rechargeable hundreds or thousands of times. Exemplary power-storing devices include Nickel-metal hydride (NiMH) batteries, Nickel-Cadmium (NiCad) batteries, and Lithium-ion (Li-ion) batteries.

The sensing subsystem 14 includes one or more sensing devices 64 for measuring a variety of characteristics. The sensing subsystem 14 may include any of a variety of sensing devices. The sensing device 64 may be connected to the converter 38, or the rectifier 60 or the power supply regulator 62 when present (or both the rectifier and power supply regulator), by a power line P and a ground line G. In many embodiments of the present invention, the sensing subsystem 14 is configured and positioned during use for sensing physical characteristics associated with the apparatus 22 from which the power-generating subsystem 12 derives energy for creating the operating power of the system 10.

Also, as described above, the sensing subsystem may be configured and positioned during use for sensing characteristics other than those associated with the apparatus 22, though still drawing operational power from the apparatus 22. For example, the power-generating subsystem 12 may be configured and positioned for capturing energy (e.g., mechanical or thermal) from the apparatus 22, and the sensing apparatus 14 may be configured and positioned for sensing a temperature or a motion (e.g., a velocity or an acceleration) that is not directly associated with the apparatus 22, such as an ambient temperature of air in a warehouse in which the apparatus 22 sits or a velocity of a part of a device other than the apparatus 22.

For sensing temperature, the sensing device 64 may include an infrared sensor. The infrared sensor may measure the temperature of an object, such as the conveyor belt 34 of the conveyor system 36 or another part of the system 22, by measuring an amount of energy within the infrared range emitting from the object. The sensing device 64 may also include a photo detector or photo sensor, such as a photocell, for sensing light or other energy, such as electromagnetic energy. Photocells may be especially helpful in sensing and/or measuring relatively low-frequency signals (e.g., low-frequency heat waves) emitted by an object.

As described in the Background of the Invention section above, improper loading on parts of the conveyor belt 34 is a leading cause of belt tears or other failures. For instance, it has been determined that although beads 50 trimming edges of many belts 34 are generally robust, they sometimes break or tear when exposed to unbalanced forces. Unbalanced forces on the belt 34 can result from, for example, improper loading conditions of items being conveyed and/or by guide or drive parts 52 of the conveyor system 36. As a result of the belt being 34 unbalanced, other parts of the apparatus 22, such as one or the other of the drive/guide wheels 52 shown in FIG. 2, provide a higher than desired force on the bead 50, which can cause failure of the bead 50 and, in the process, cause the bead 50 to heat. Accordingly, if rises in temperature of the bead 50 are detected early, adjustments can be made in the system, automatically or by operating personnel, to avoid failure, or at least to avoid some damage or injury that may otherwise result from the failure.

The sensor system 10 may include more than one sensing device 64. Such a multi-point sensing arrangement may measure the same physical characteristic of the apparatus 22 at different locations and/or different characteristics at about the same location of the apparatus 22. The processing subsystem 18, shown in FIG. 1A and described in more detail below, may process signals received from multiple sensing devices 64 as part of monitoring the apparatus 22.

Each sensing device 64 produces an output signal corresponding to sensations or measurements of the sensing device 64. For example, when the sensing device 64 includes an infrared sensor measuring temperature of an object (e.g., the bead 50 of the conveyor belt 34), the device 64 produces a sensor output corresponding to the temperature of the object. It is contemplated that the sensing device 64 may be configured to produce an output signal continuously, intermittently or periodically (e.g., every hour).

The sensing subsystem 14 may further include at least one sensor amplifier 66. Each amplifier 66 may be connected to a corresponding sensing device 64 by a power line P, a ground line G, and a signal line S, wherein the signal line S carries the sensor output signal. The amplifier 66 amplifies the sensor output signal for easier recognition by components of the sensor system 10 downstream of the sensing device 64, such as those in the transmitting subsystem 16 and the processing subsystem 18. The amplifier 66 may be a part of the sensing device 64 or connected to it. The amplifier 66 may also be a part of the transmitting subsystem 16, such as a part of or connected to a transmitter 68.

As described above and shown in FIG. 1A, the sensor system 10 according to the present invention may include a transmitting subsystem 16 receiving the sensor output signal(s) from the sensing subsystem 14. The transmitting subsystem 16 may receive its operating power from the power-generating subsystem 12 directly or by way of power lines P also connected to the sensing device 64.

The transmitting subsystem 16 includes at least one transmitter 68 for transmitting the sensor output signal to a receiver 70. The transmitter 68 may be connected to the sensing device 64 by a power line P, a ground line G, and a signal line S, wherein the signal line S carries the sensor output signal. It is contemplated that the transmitter 68 may transmit a signal corresponding to the output signal of the sensing device 64, such as a signal converted to a different format than the output of the sensing device 64, but having character or values corresponding to the sensor output. Such converted signal transmitted by the transmitter 68 may nonetheless be referred to as the sensor signal because it is based on the output of the sensing device 64.

As described above, the transmitter 68 may include or be associated with an amplifier for amplifying the sensor output before transmitting it. The receiver 70 may be a part of the processing subsystem 18 and may be remote to the transmitter 66. The transmitter 68 may send the output signal from the sensing device 64, whether converted and/or amplified, to the receiver 70 by one or more hard wires or wirelessly. Conventional formats of wirelessly transmitting signals may be used for transmission, such as radiofrequency, infrared, personal area network, or other signals.

It is contemplated that the sensor system 10 may also include a transmitter-side processor (not shown), such as a programmable logic controller, relatively closely connected to the transmitter 68 for converting the sensor output signal into information that is in turn transferred to the remote receiver 70 and processor 72 by way of the transmitter 68. The transmitter-side processor of this embodiment may be considered as part of the transmitting subsystem 16 or the processing subsystem 18. Transmission of such information signal produced by the transmitter-side processor may be transmitted by wire or wirelessly transmitted to the remote receiver 70 and processor 72. Conventional means of transmitting information signals may be used for this purpose, including using radiofrequency, infrared, Bluetooth®, wireless local area network (WLAN), Wi-Fi, or other types of signals (Bluetooth is a registered trademark of Bluetooth Sig, Inc., Corporation, of Bellevue, Wash.). As described above, the system may be referred to as "wireless" because the system may be free of hard-wired communication lines to the remote processing subsystem 18 and possibly also because it may not require input power lines for power.

It is also contemplated that the transmitter 68 may be configured for receiving communication signals from the receiver 70. For example, if the sensor system 10 includes a transmitter-side processor (not shown), the remote processor 72 may communicate information to the transmitter-side processor by way of the receiver 70 and the transmitter 68. Exemplary communications sent to the transmitting subsystem 16 from the processing subsystem 18 may include, for example, instructions for sensor operations (e.g., timing of sensing, directions at which a sensor senses, etc.).

The receiver 70 of the processing subsystem 18 is configured to receive signals from the transmitter 68. For example, if the transmitter 68 is structured to send radiofrequency signals, the receiver 70 would correspondingly be structured to receive radiofrequency signals for communicating with the transmitter 68. The receiver 70 is connected to the processor 72 for transferring the signals received from the transmitter 68 to the processor 72.

The processor 72 may be remote to the power-generating, sensing, and transmitting subsystems 12, 14, 16, and may include processors such as a personal computer or a programmable logic controller (PLC). The processor 72 is configured to process the sensor output signal received from the transmitter 68 for creating a message corresponding to the sensor output signal. The resulting message may take many forms and include various types of information corresponding to the sensor output signal. The term, "message", is used herein in a broad sense to include information, signals, and other data stored in and/or produced by the processor 72.

The processor 72 may create a warning message when it determines that the sensor output signal includes a measured value being outside of a predetermined range or above or below a predetermined threshold. The message formed by the processor 72 could also include non-warning information, such as measured values of the sensor output signal within desired ranges. The processor 72 may save the sensor output signal and/or messages corresponding to the signal created during processing of the signal, in a storage device (e.g., hard-drive) or transfer to such as a storage device. The processor 72, another processor (not shown), and/or operators of the apparatus 22, may reference the stored messages, such as for reviewing history of apparatus 22 operating conditions or interpreting signals later received from the transmitting subsystem 14.

Users of the sensor system 10 may communicate with the processor 72 in a variety of ways and for a variety of reasons without departing from the scope of the present invention. For example, users may communicate with the processor 72 by way of conventional computer interfaces, such as a keyboard 74, a mouse 76, and a display screen 78, which may display information and be a touch-screen for receiving input communication from the user. Using the interfaces, the user may review new or stored messages created by the processor.

The communicating subsystem 20 is connected to the processing subsystem 18 and configured for presenting information to users of the sensor system 10, such as messages received from the processing subsystem 18. The communicating subsystem 20 may also be configured for receiving inputs from the user, such as inquiries regarding incoming or stored signals or messages, instructions for structuring presentation of messages, and instructions for controlling operation of the processing, transmitting, and sensing subsystems 18, 16, 14.

The communicating subsystem 20 includes one or more communication instruments, such as visual displays or audible sources. Exemplary visual displays include a display screen 78 and indicating lights 80 such as light-emitting diodes (LEDs) (shown in FIG. 1). The communicating subsystem 20 may also include one or more audible sources, such as speakers 82.

The communication subsystem 20 communicates messages created in the processing subsystem 18 to a user of the sensor system 10. For example, messages from the processor including a value corresponding to the temperature of an object (e.g., the bead 50) being sensed by the system 10 could be displayed on the display screen 78. As another example, if the processor 72 determines that a physical characteristic (e.g., temperature) being measured by the sensing subsystem 14 is outside of a predetermined or preset range, or above or below a predetermined threshold, the processor 72 can communicate a warning or alert message by way of the communicating subsystem 20, such as by causing lights 80 to blink and/or speakers to emit verbal information or tones, sirens, beeps, etc.

The communicating subsystem 20 may also display or otherwise communicate information in different ways corresponding to different predetermined levels of the physical characteristic being measured by the sensing system 14. For example, the communicating subsystem 20 may include LEDs 80 having different colors and the system 10 may illuminate a green LED of these LEDs when a measured value (e.g., temperature of the bead 50) is within an acceptable range, an orange LED when the measured value is slightly outside of the range, and a red LED when the measured value is outside of the range by more than a predetermined amount (e.g., 5% above a preset temperature). Similarly, the communicating subsystem 20 may emit sounds corresponding to values measured by the sensing subsystem 14 in light of predetermined levels. For instance, the communicating subsystem 20 may emit a certain beeps when the measured value is slightly outside of the range, such as slow and/or quite beeps, but emit different beeps, such as quicker and/or louder beeps, when the measured value is outside of the range by more than a predetermined amount.

As described above, the processing subsystem 18 may provide feedback to the upstream subsystems 12, 14, 16, such as for controlling the sensor 64 or transmitter 68 depending on determinations reached during processing of the sensor output. Such feedback may be considered one of the above-mentioned messages formed by the processing subsystem 18.

The processing subsystem 18 may also communicate with the apparatus 22, and a nature of that communication may depend on determinations reached during processing of the sensor output. For example, in response to determining that a value of a sensed physical characteristic (e.g., temperature of the bead 50) is outside of a predetermined range or above a threshold, the processing subsystem 18 may send a message to the apparatus 22 (e.g., conveyor system 36). When the processing subsystem 18 sends the message to the apparatus 22, such as to a processor (e.g., computer or PLC) associated with the apparatus, the apparatus may store the information and/or change its operations, such as by temporarily halting the conveyor belt 34 of the conveyor system 36 for inspection and possibly maintenance.

It is contemplated that in response to the apparatus 22 receiving a message from the processing subsystem 18, the apparatus 22 may automatically adjust its operations to change a condition related to the message. For example, if the sensor system 10 determines that the bead 50 of the conveyor system 36 is too hot and sends a message indicating the same to the apparatus, the apparatus may adjust the belts or driving or guiding parts (e.g., drive/guide wheels 52) in effort to improve the conditions causing the bead to undesirably heat up.

As another example, the apparatus 22 may be configured to have a temporary state, which the apparatus 22 may switch to in response to a particular message from the processing subsystem 18. For instance, it is contemplated that the conveyor system 36 may include one or more conveyor by-passes, structured to bypass certain parts of the conveyor system 36, such as curved parts (such as that shown in FIG. 2) or other parts determined to have a relatively high potential of problem. In application, if the sensor system 10 determines that a temperature of the bead 50 of the conveyor belt 34 is too high, the sensor system 10 may send a signal to the apparatus 22 instructing the apparatus of the same. The apparatus 22 may in turn initiate a by-pass conveyor path, allowing package to continue to convey through the conveyor system 36 without passing the problem area, and temporarily halt operation of the problem area for inspection and maintenance.

It is also contemplated that in some embodiments, the entire sensor system 10 or parts thereof (e.g., the processing subsystem 18) may be considered a part of the apparatus 22. For example, determinations made in the processing subsystem 18 being part of the apparatus 22 to automatically alter operation of the apparatus may be implemented by the processor 72 sending instruction signals to respective parts of the apparatus 22, without need to communicate with another processor.

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended listing of inventive concepts. Although specific terms are employed herein, they are used in a generic and descriptive sense only and not for purposes of limitation.

What is claimed is:

1. A wireless sensor system associated with a package handling system from which the wireless sensor system generates operating power, the sensor system comprising:
   a power-generating subsystem configured for generating power from energy derived from the package handling system, wherein the energy comprises thermal energy, mechanical energy, or both; and
   a sensor connected to the power-generating subsystem for receiving the power generated by the power-generating subsystem, the sensor being configured to sense a physical characteristic associated with the package handling system.

2. A wireless sensor system as set forth in claim 1, wherein:
   the package handling system is a conveying system having a belt and the physical characteristic is associated with the conveying system; and
   the power-generating subsystem generates said operating power from energy derived from the conveying system and the sensor senses the physical characteristic being associated with the conveying system.

3. A wireless sensor system as set forth in claim 2, wherein the power-generating subsystem comprises:
   at least one axle;
   a roller rotatably connected to at least one axle;
   a link connected to the roller; and
   a generator connected to the link;
   wherein the power-generating subsystem is configured so that when the roller is positioned in contact with the belt of the conveying system, the roller rotates about the axle or with the axle in response to movement of the belt;
   wherein the link is configured for transferring rotary motion from the roller to the generator; and
   wherein the generator generates the power using the rotary motion input by the link during operation of the sensor system.

4. A wireless sensor system as set forth in claim 3, wherein the power-generating subsystem further includes a spring mechanism connected to the axle for biasing the roller toward the belt of the conveying system to ensure the roller contacts the belt during operation of the sensor system.

5. A wireless sensor system as set forth in claim 3, wherein the power-generating subsystem comprises two rollers rotatably connected to two corresponding axles so that the rollers may be positioned on opposite sides of the belt, each in contact with the belt, so that the rollers rotate in opposite directions about their respective axles in response to the belt translating during operation of the sensor system.

6. A wireless sensor system as set forth in claim 3, wherein said physical characteristic associated with the conveying system is selected from a group of physical characteristics consisting of a temperature of the belt, another temperature associated with the conveying system, a velocity of the belt, and an acceleration of the belt.

7. A wireless sensor system as set forth in claim 1, wherein the sensor is an infrared sensor or a photo detector.

8. A method of monitoring an apparatus using a wireless sensor system including a power-generating subsystem and a sensor connected to the power-generating subsystem, the apparatus comprising a conveying system having a belt, the method comprising:
   providing the wireless sensor system adjacent the apparatus;
   generating power from energy derived from the conveying system using the power-generating subsystem, wherein the energy comprises thermal energy, mechanical energy, or both;
   transferring the power generated in the power-generating step from the power-generating subsystem to the sensor; and
   sensing a physical characteristic associated with the conveying system using the sensor being powered by the power received from the generator.

9. A method of monitoring an apparatus as set forth in claim 8 wherein the power-generating subsystem includes at least one axle, a roller connected to at least one axle, a link connected to the roller, and a generator connected directly to the link, and the generating step includes:
   operating the conveying system so that the belt translates thereby causing the roller in contact with the belt to rotate about the axle; and
   transferring rotary motion of the roller to the generator by way of the link.

10. A method of monitoring an apparatus as set forth in claim 8 wherein the wireless sensor system further includes a transmitter connected to the sensor and the generator, a processor remote from the sensor, a receiver connected to the processor, and the method further comprises:
   producing a sensor output using the sensor;
   transferring the sensor output to the transmitter;
   transmitting the sensor output to the receiver using the transmitter; and
   transferring the sensor output signal from the receiver to the processor.

11. A method of monitoring an apparatus as set forth in claim 10 wherein the wireless sensor system further includes a communication interface connected to the processor and the method further comprises:
   processing the sensor output signal using the processor to create a message corresponding to the signal;
   transferring said message from the processor to the communication interface; and
   communicating the message to users of the sensor system by way of the communication interface.

12. A method of monitoring an apparatus as set forth in claim 8, wherein said physical characteristic associated with the conveying system is selected from a group of physical characteristics consisting of a temperature of the belt, another temperature associated with the conveying system, a velocity of the belt, and an acceleration of the belt.

13. A system comprising:
a conveying system comprising a conveyor belt;
a wireless sensor system associated with the conveying system, wherein the wireless sensor system comprises:
a sensor configured to sense a physical characteristic associated with the conveying system;
a power-generating subsystem configured to convert energy derived from the motion of the conveyor belt into power, wherein the sensor is connected to the power-generating subsystem to receive the power to operate the sensor.

14. A system as set forth in claim 13, wherein the power-generating subsystem comprises:
at least one axle;
a roller rotatably connected to at least one axle;
a link connected to the roller; and
a generator connected to the link.

15. A system as set forth in claim 14, wherein the power-generating subsystem is configured so that when the roller is positioned in contact with the belt of the conveying system, the roller rotates about the axle or with the axle in response to movement of the belt.

16. A system as set forth in claim 15, wherein the link is configured for transferring rotary motion from the roller to the generator.

17. A system as set forth in claim 16, wherein the generator generates the power using the rotary motion input by the link during operation of the wireless sensor system.

18. A system as set forth in claim 15, wherein the power-generating subsystem further includes a spring mechanism connected to the axle for biasing the roller toward the belt of the conveying system to ensure the roller contacts the belt during operation of the sensor system.

19. A system as set forth in claim 15, wherein the power-generating subsystem comprises two rollers rotatably connected to two corresponding axles so that the rollers may be positioned on opposite sides of the belt, each in contact with the belt, so that the rollers rotate in opposite directions about their respective axles in response to the movement of the belt during operation of the sensor system.

20. A system as set forth in claim 13, wherein said physical characteristic associated with the conveying system is selected from a group of physical characteristics consisting of a temperature of the belt, another temperature associated with the conveying system, a velocity of the belt, and an acceleration of the belt.

21. A system as set forth in claim 13, wherein the sensor is an infrared sensor or a photo detector.

22. A system as set forth in claim 13, wherein the energy derived from the motion of the conveyor belt comprises thermal energy, mechanical energy, or both.

* * * * *